(12) United States Patent
Kim et al.

(10) Patent No.: US 10,218,197 B2
(45) Date of Patent: Feb. 26, 2019

(54) ELECTRONIC DEVICE AND METHOD FOR UTILIZING PLURALITY OF CHARGING CIRCUITS

(71) Applicant: Samsung Electronics Co., Ltd., Gyeonggi-do (KR)

(72) Inventors: Hee Tae Kim, Gyeonggi-do (KR); Ku Chul Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 66 days.

(21) Appl. No.: 15/165,740

(22) Filed: May 26, 2016

(65) Prior Publication Data

US 2016/0352124 A1 Dec. 1, 2016

(30) Foreign Application Priority Data

May 26, 2015 (KR) .................. 10-2015-0073026

(51) Int. Cl.
*H02J 7/00* (2006.01)

(52) U.S. Cl.
CPC .......... *H02J 7/0055* (2013.01); *H02J 7/0036* (2013.01); *H02J 7/0052* (2013.01); *H02J 7/0068* (2013.01); *H02J 7/0072* (2013.01)

(58) Field of Classification Search
CPC ........ H02J 7/0055; H02J 7/022; H02J 7/0031; Y02T 10/7005; Y02T 90/121
USPC ........................................................ 320/138
See application file for complete search history.

(56) References Cited

U.S. PATENT DOCUMENTS

| 5,949,216 | A | 9/1999 | Miller | |
|---|---|---|---|---|
| 2010/0117599 | A1* | 5/2010 | Chow | H01M 10/441 320/118 |
| 2010/0127666 | A1 | 5/2010 | Ball | |
| 2010/0231172 | A1 | 9/2010 | Bastami et al. | |
| 2010/0259226 | A1* | 10/2010 | Deng | H02J 7/0052 320/150 |
| 2010/0327816 | A1* | 12/2010 | Chiang | H02J 7/022 320/145 |
| 2014/0009120 | A1* | 1/2014 | Kim | H02J 7/0068 320/138 |
| 2014/0111139 | A1* | 4/2014 | Chen | H01F 27/28 320/107 |
| 2014/0217816 | A1 | 8/2014 | Okada | |
| 2015/0357830 | A1 | 12/2015 | Gotou | |

(Continued)

FOREIGN PATENT DOCUMENTS

| KR | 1020080065047 | 7/2008 |
|---|---|---|
| KR | 1020100049896 | 5/2010 |
| KR | 1020130055728 | 5/2013 |

(Continued)

OTHER PUBLICATIONS

European Search Report dated Aug. 26, 2016 issued in counterpart application No. 16171497.7-1804, 8 pages.

(Continued)

*Primary Examiner* — Arun C Williams
(74) *Attorney, Agent, or Firm* — The Farrell Law Firm, P.C.

(57) ABSTRACT

Methods and apparatuses are provided for an electronic device. A connection of the electronic device with a charging device is detected. A state of the electronic device is determined. One of a first charging circuit and a second charging circuit is selected based on the state of the electronic device.

12 Claims, 13 Drawing Sheets

(56) References Cited

U.S. PATENT DOCUMENTS

2016/0020831 A1* 1/2016 Hamada .................. H02J 7/042
 320/108

FOREIGN PATENT DOCUMENTS

| WO | WO 2013/030648 | 3/2013 |
| WO | WO 2014/118853 | 8/2014 |

OTHER PUBLICATIONS

European Search Report dated Mar. 1, 2018 issued in counterpart application No. 16171497.7-1202, 7 pages.

* cited by examiner

ELECTRONIC DEVICE AND METHOD FOR UTILIZING PLURALITY OF CHARGING CIRCUITS

PRIORITY

This application claims priority under 35 U.S.C. § 119(a) to Korean Patent Application No. 10-2015-0073026, filed in the Korean Intellectual Property Office on May 26, 2015, the disclosure of which is incorporated herein by reference.

BACKGROUND

1. Field of the Disclosure

The present disclosure relates generally to a charging circuit for use in an electronic device, and more particularly, to an electronic device and a method for selecting a charging circuit for use based on a state of the electronic device.

2. Description of the Related Art

With the recent development of information communication technology, a network devices, such as a base stations, and an electronic device allow a user to freely use networks by transmitting/receiving data to/from another electronic device through the network.

Various kinds of electronic devices provide various functions according to recent digital convergence trends. For example, in addition to a call function, smartphones support Internet access functions by using the network, music or video playback functions, and/or picture and video capturing functions by using an image sensor.

Due to the convenience of such functions, a user carries an electronic device (for example, a smartphone) all the time, and various issues relating to battery life of the electronic device may arise.

SUMMARY

The present disclosure has been made to address at least the above problems and/or disadvantages and to provide at least the advantages described below. Accordingly, an aspect of the present disclosure provides a method in which an electronic device that includes a plurality of charging circuits selects and uses one charging circuit according to a state of the electronic device.

In accordance with an aspect of the present disclosure, an electronic device is provided that includes a first charging circuit and a second charging circuit configured to charge a battery of the electronic device. The electronic device also includes a state determination module configured to detect a connection of the electronic device to a charging device, and determine a state of the electronic device. The electronic device further includes a processor configured to select one of the first charging circuit and the second charging circuit based on the state of the electronic device.

In accordance with another aspect of the present disclosure, a method performed in an electronic device is provided. A connection of the electronic device with a charging device is detected. A state of the electronic device is determined. One of a first charging circuit and a second charging circuit is selected based on the state of the electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
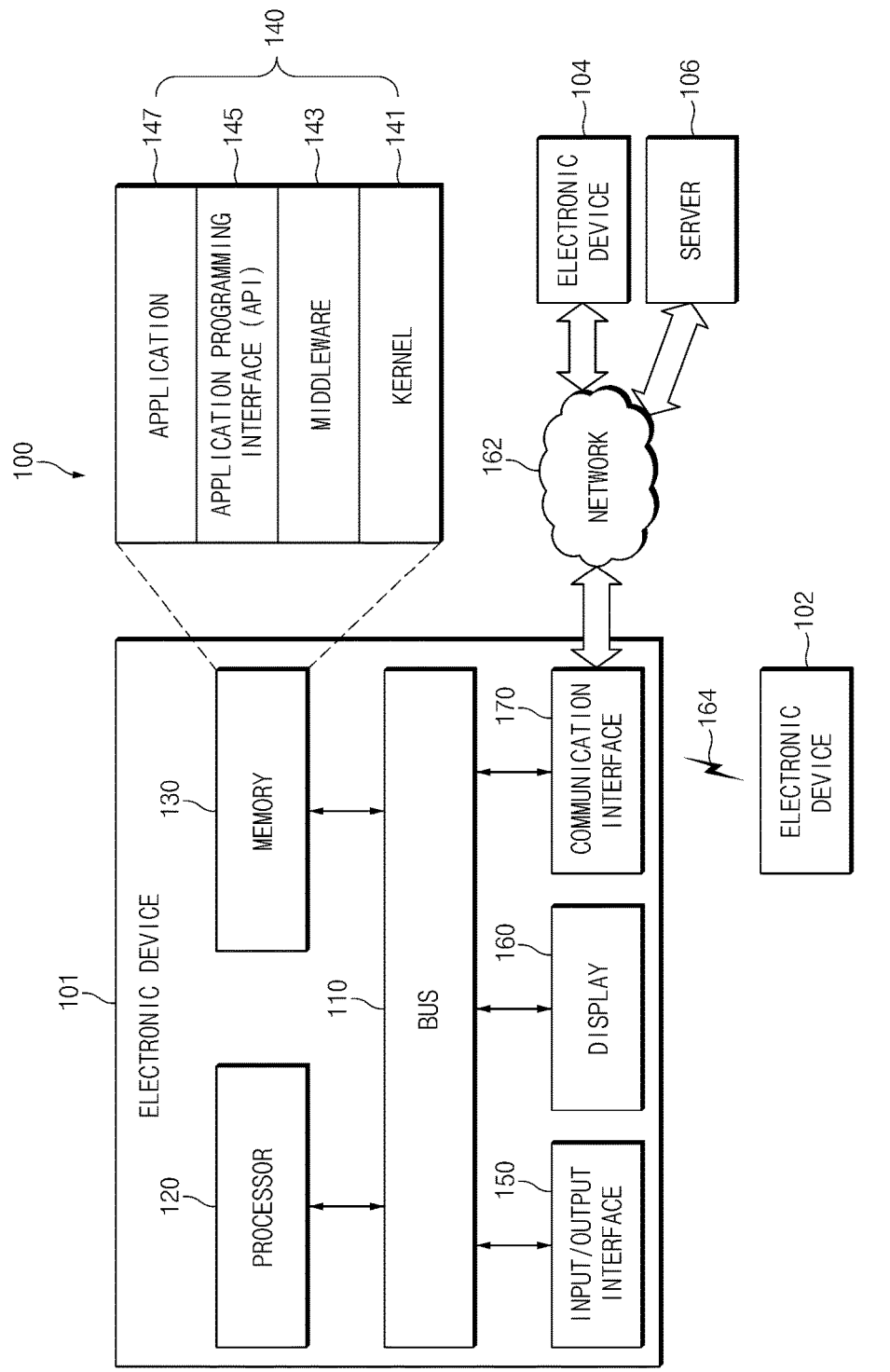
FIG. 1 is a diagram illustrating an electronic device in a network environment, according to an embodiment of the present disclosure.

Embodiments of the present disclosure are disclosed in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms "include," "comprise," "have", "may include," "may comprise," and "may have", as used herein, indicate disclosed functions, operations, or the existence of elements, but do not exclude additionally functions, operations or elements.

For example, the expressions "A or B" and "at least one of A and B" may indicate include A, B, or both A and B. Additionally, the expression "A or B" and "at least one of A and B" may indicate (1) at least one A, (2) at least one B, or (3) both at least one A and at least one B.

Terms such as "first", "second", and the like, as used herein, may be used to modify different elements of embodiments of the present disclosure, but do not limit the elements. For example, "a first user device" and "a second user device" may indicate different user devices regardless of their order or importance. Additionally, a first component may be referred to as a second component, and vice versa, without departing from the scope of the present disclosure.

In embodiments of the present disclosure, when a component (for example, a first component) is referred to as being "(operatively or communicatively) coupled with/to" or "connected to" another component (for example, a second component), the component may be directly connected to the other component or connected through another component (for example, a third component). In embodiments of the present disclosure, when a component (for example, the first component) is referred to as being "directly connected to" or "directly accessing" another component (for example, the second component), another component (for example, the third component) does not exist between the component (for example, the first component) and the other component (for example, the second component).

The expression "configured to", as used herein, may be interchangeably used with "suitable for", "having the capacity to", "designed to", "adapted to", "made to", or "capable of", according to a situation, for example. The term "configured to" may not necessarily mean "specifically designed to" in terms of hardware. Instead, the expression "a device configured to" in some situations may mean that the device and another device or part are "capable of". For example, "a processor configured (or set) to perform A, B, and C" may mean a dedicated processor (for example, an embedded processor) for performing a corresponding operation or a generic-purpose processor (for example, a central processing unit (CPU) or application processor (AP)) for performing corresponding operations by executing at least one software program stored in a memory device.

Terms used herein are used to describe embodiments of the present disclosure, and are not intended to limit the scope of other embodiments. The terms of a singular form may include plural forms unless they have a clearly different meaning in the context. Unless otherwise indicated herein, all terms used herein, which include technical or scientific terms, may have the same meanings as those generally understood by a person skilled in the art. In general, the terms defined in the dictionary should be considered to have the same meanings as the contextual meanings of the related art, and, unless clearly defined herein, should not be understood abnormally or as having an excessively formal meaning. Terms defined herein cannot be interpreted as excluding embodiments of the present disclosure.

According to embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia players (PMPs), MP3 players, mobile medical devices, cameras, and wearable devices. According to embodiments of the present disclosure, wearable devices may include at least one of accessory types (e.g., watches, rings, bracelets, anklets, necklaces, glasses, contact lenses, or head-mounted-devices (HMDs)), fabric or garment integrated types (for example, e-apparel), body-mounted types (for example, skin pads or tattoos), or bio-implantation types (for example, implantable circuits).

According to embodiments of the present disclosure, an electronic device may be home appliance. The home appliance may include at least one of, for example, televisions, digital versatile disc (DVD) players, audios, refrigerators, air conditioners, cleaners, ovens, microwave ovens, washing machines, air cleaners, set-top boxes, home automation control panels, security control panels, TV boxes, game consoles, electronic dictionaries, electronic keys, camcorders, and electronic picture frames.

According to embodiments of the present disclosure, an electronic device may include at least one of various medical devices supporting a call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global navigation satellite system (GNSS), event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller machines (ATMs), or point of sales (POS) devices or Internet of Things (IoT) devices (for example, light bulbs, various sensors, electric or gas meters, sprinkler systems, fire alarms, thermostats, street lights, toasters, exercise equipment, hot water tanks, heaters, boilers, etc.).

In embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device, according to embodiments of the present disclosure, may be one of the above-described devices or a combination thereof. Additionally, an electronic device, according to an embodiment of the present disclosure, may be a flexible electronic device. Additionally, an electronic device, according to an embodiment of the present disclosure, is not limited to the above-described devices and may include a new kind of an electronic device, according to technology development.

Hereinafter, the term "user" may refer to a person using an electronic device or a device using an electronic device (for example, an artificial intelligence electronic device).

Additionally, as described in embodiments below, with reference to the accompanying drawings, an electronic device is a smartphone.

Referring to FIG. 1, a diagram illustrates an electronic device in a network environment, according to an embodiment of the present disclosure. An electronic device 101 in a network environment 100 includes a bus 110, a processor 120, a memory 130, an input/output interface 150, a display 160, and a communication interface 170. According to an embodiment of the present disclosure, the electronic device 101 may only include at least one of the components or may include different and/or additional components.

The bus 110, for example, may include a circuit for connecting the components 120 to 170 to each other and providing communication (for example, control message and/or data) therebetween.

The processor 120 may include at least one of a CPU, an AP, and a communication processor (CP). The processor 120, for example, may execute calculation or data processing for control of and/or communication with at least one another component of the electronic device 101.

The memory 130 may include volatile and/or nonvolatile memory. The memory 130, for example, may store instructions or data relating to at least one other component of the electronic device 101. According to an embodiment of the present disclosure, the memory 130 stores software and/or a program 140. The program 140 includes a kernel 141, a middleware 143, an application programming interface (API) 145, and an application program (or an application) 147. At least part of the kernel 141, the middleware 143, and the API 145 may be referred to as an operating system (OS).

The kernel 141, for example, may control or manage system resources (for example, the bus 110, the processor 120, the memory 130, and so on) used for performing operations or functions implemented in other programs (for example, the middleware 143, the API 145, or the application program 147). Additionally, the kernel 141 may provide an interface for controlling or managing system resources by accessing an individual component of the electronic device 101 from the middleware 143, the API 145, or the application program 147.

The middleware 143, for example, may serve in an intermediary role for exchanging data as the API 145 or the application program 147 communicates with the kernel 141

Additionally, the middleware 143 may process at least one job request received from the application program 147 according to a priority. For example, the middleware 143 may assign to at least one application program 147 a priority for using a system resource (for example, the bus 110, the processor 120, or the memory 130) of the electronic device 101. For example, the middleware 143 may perform scheduling or load balancing on the at least one job request by processing the at least one job request according to the priority assigned to the at least one job request.

The API 145, as an interface for allowing the application program 147 to control a function provided from the kernel 141 or the middleware 143, may include at least one interface or function (for example, an instruction) for file control, window control, image processing, or character control.

The input/output interface 150, for example, may serve as an interface for delivering instructions or data inputted from a user or another external device to another component(s) of the electronic device 101. Additionally, the input/output interface 150 may output instructions or data received from another component(s) of the electronic device 101 to a user or another external device.

The display 160, for example, may include a liquid crystal display (LCD), a light emitting diode (LED) display, an organic light emitting diode (OLED) display, a microelectromechanical systems (MEMS) display, or an electronic paper display. The display 160 may display various contents (for example, text, an image, video, an icon, a symbol, and so on) to a user. The display 160 may include a touch screen, and for example, may receive a touch, gesture, proximity, or hovering input by using an electronic pen or a part of a user's body.

The communication interface 170, for example, may set a communication between the electronic device 101 and an external device (for example, a first external electronic device 102, a second external electronic device 104, or a server 106). For example, the communication interface 170 may communicate with an external device (for example, the second external electronic device 104 or the server 106) in connection with the network 162 through wireless communication or wired communication.

The wireless communication, as a cellular communication protocol, may use at least one of long-term evolution (LTE), LTE-advanced (LTE-A), code division multiple access (CDMA), wideband CDMA (WCDMA), universal mobile telecommunications system (UMTS), wireless broadband (WiBro), global systems for mobile communications (GSM), etc. Additionally, the wireless communication, for example, may include short-range communication 164. The short range communication 164, for example, may include at least one of wireless fidelity (WiFi), Bluetooth (BT), near field communication (NFC), global positioning system (GPS), etc. The GNSS may include at least one of GPS, Glonass, and Beidou navigation satellite system, and the European global satellite-based navigation system (Galileo). Hereinafter, GPS and GNSS may be interchangeably used. The wired communication, for example, may include at least one of universal serial bus (USB), high definition multimedia interface (HDMI), recommended standard 232 (RS-232), plain old telephone service (POTS), etc. The network 162 may include telecommunications network, for example, at least one of a computer network (for example, local area network (LAN) or wide area network (WAN)), the Internet, and telephone network.

Each of the first and second external electronic devices 102 and 104 may be of the same type as or a different type from the electronic device 101. According to an embodiment of the present disclosure, the server 106 may include a group of one or more servers. According to embodiments of the present disclosure, all or part of operations executed on the electronic device 101 may be executed on at least one other electronic device 102, 104, or the server 106. When the electronic device 101 performs a certain function or service automatically or by request, it may request at least part of a function relating thereto from another electronic device instead of or in addition to executing the function or service by itself. The other electronic devices may execute the requested function or an additional function and may deliver an execution result to the electronic device 101. The electronic device 101 may provide the requested function or service as it is or by processing the received result. For example, cloud computing, distributed computing, or client-server computing technology may be used.

Figure 2:
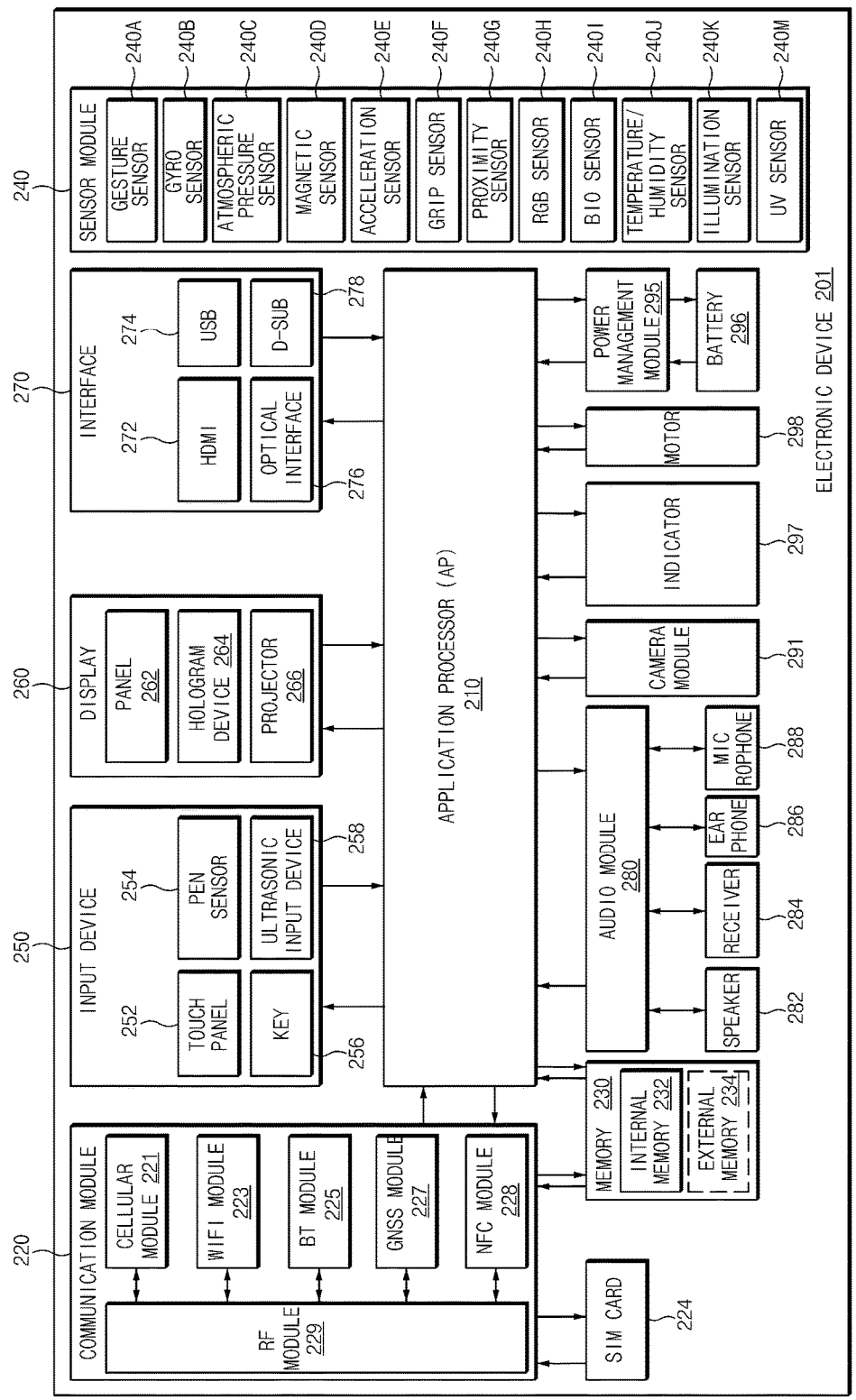
FIG. 2 is a block diagram illustrating an electronic device, according to an embodiment of the present disclosure.

FIG. 2 is a block diagram illustrating an electronic device, according to an embodiment of the present disclosure. An electronic device 201, for example, may include all or part of the electronic device 101 of FIG. 1. The electronic device 201 includes at least one processor (for example, an AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected thereto, and also may perform various data processing and operations by executing an OS or an application program. The processor 210 may be implemented with a system on chip (SoC), for example. According to an embodiment of the present disclosure, the processor 210 may further include a graphic processing unit (GPU) and/or an image signal processor. The processor 210 may include at least a part (for example, a cellular module 221) of components shown in FIG. 2. The processor 210 may load commands or data received from at least one of other components (for example, nonvolatile memory) and process them, and may store various data in a nonvolatile memory.

The communication module 220 may have the same configuration as or a similar configuration to the communication interface 170 of FIG. 1. The communication module 220 includes a cellular module 221, a WiFi module 223, a BT module 225, a GNSS module 227 (for example, a GPS module, a Glonass module, a Beidou module, or a Galileo module), an NFC module 228, and a radio frequency (RF) module 229.

The cellular module 221, for example, may provide voice call, video call, text service, or Internet service through communication network. According to an embodiment of the present disclosure, the cellular module 221 may perform a distinction and an authentication operation on the electronic device 201 in a communication network by using the SIM card 224. According to an embodiment of the present disclosure, the cellular module 221 may perform at least a part of a function that the processor 210 provides. According to an embodiment of the present disclosure, the cellular module 221 may include a CP.

Each of the WiFi module 223, the BT module 225, the GNSS module 227, and the NFC module 228 may include a processor for processing data transmitted/received through a corresponding module. According to an embodiment of the present disclosure, at least a part (for example, at least one) of the cellular module 221, the WiFi module 223, the BT module 225, the GNSS module 227, and the NFC module 228 may be included in one integrated chip (IC) or IC package.

The RF module 229, for example, may transmit/receive communication signals (for example, RF signals). The RF module 229, for example, may include a transceiver, a power amp module (PAM), a frequency filter, a low noise amplifier (LNA), or an antenna.

According to another embodiment of the present disclosure, at least one of the cellular module 221, the WiFi module 223, the BT module 225, the GNSS module 227, and the NFC module 228 may transmit/receive RF signals through a separate RF module.

The SIM 224 card, for example, may include a card including a SIM and/or an embedded SIM, and also may include unique identification information (for example, an integrated circuit card identifier (ICCID)) or subscriber information (for example, an international mobile subscriber identity (IMSI)).

The memory 230 (for example, the memory 130 of FIG. 1) includes at least one of an internal memory 232 and an external memory 234. The internal memory 232 may include at least one of a volatile memory (for example, dynamic random access memory (RAM) (DRAM), static RAM (SRAM), synchronous DRAM (SDRAM)), and a non-volatile memory (for example, one time programmable read only memory (ROM) (OTPROM), programmable ROM (PROM), erasable and programmable ROM (EPROM), electrically EPROM (EEPROM), mask ROM, flash ROM, flash memory (for example, NAND flash or NOR flash), hard drive, and solid state drive (SSD)).

The external memory 234 may further include a flash drive, for example, compact flash (CF), secure digital (SD), Micro-SD, Mini-SD, extreme digital (xD), multi media card (MMC), or a memory stick. The external memory 234 may be functionally and/or physically connected to the electronic device 201 through various interfaces.

The sensor module 240 measures physical quantities or detects an operating state of the electronic device 201, thereby converting the measured or detected information into electrical signals. The sensor module 240 includes at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and an ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. According to an embodiment of the present disclosure, the electronic device 201 may further include a processor configured to control the sensor module 240 as part of or separately from the processor 210 and thus may control the sensor module 240 while the processor 210 is in a sleep state.

The input device 250 includes at least one of a touch panel 252, a (digital) pen sensor 254, a key 256, and an ultrasonic input device 258. The touch panel 252 may use at least one of capacitive, resistive, infrared, or ultrasonic methods, for example. Additionally, the touch panel 252 may further include a control circuit. The touch panel 252 may further include a tactile layer to provide tactile response to a user.

The (digital) pen sensor 254, for example, may include a sheet for recognition as part of a touch panel or a separate sheet for recognition. The key 256 may include a physical button, an optical key, or a keypad, for example. The ultrasonic input device 258 may detect ultrasonic waves generated from an input tool through a microphone 288 in order to check data corresponding to the detected ultrasonic waves.

The display 260 (for example, the display 160) includes at least one of a panel 262, a hologram device 264, or a projector 266. The panel 262 may have the same configuration as or a similar configuration to the display 160 of FIG. 1. The panel 262 may be implemented to be flexible, transparent, or wearable, for example. The panel 262 and the touch panel 252 may be configured with one module. The hologram device 264 may show three-dimensional images in the air by using the interference of light. The projector 266 may display an image by projecting light on a screen. The screen, for example, may be placed inside or outside of the electronic device 201. According to an embodiment of the present disclosure, the display 260 may further include a control circuit for controlling the panel 262, the hologram device 264, or the projector 266.

The interface 270 includes at least one of an HDMI 272, a USB 274, an optical interface 276, and a D-subminiature (sub) 278, for example. The interface 270, for example, may be included in the communication interface 170 shown in FIG. 1. Additionally or alternatively, the interface 270 may include a mobile high-definition link (MHL) interface, an SD card/multi-media card (MMC) interface, or an infrared data association (IrDA) standard interface.

The audio module 280 may convert sound into electrical signals and convert electrical signals into sounds. At least some components of the audio module 280, for example, may be included in the input/output interface 145 of FIG. 1. The audio module 280 may process sound information inputted/outputted through a speaker 282, a receiver 284, an earphone 286, or the microphone 288.

The camera module 291, as a device for capturing a still image and a video, may include at least one image sensor (for example, a front sensor or a rear sensor), a lens, an image signal processor (ISP), or a flash (for example, an LED or a xenon lamp).

The power management module 295 may manage the power of the electronic device 201. According to an embodiment of the present disclosure, the power management module 295 may include a power management IC (PMIC), a charger IC, or a battery gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 296, or a voltage, current, or temperature thereof during charging. The battery 296, for example, may include a rechargeable battery and/or a solar battery.

The indicator 297 may display a specific state of the electronic device 201 or part thereof (for example, the processor 210), for example, a booting state, a message state, or a charging state. The motor 298 may convert electrical signals into mechanical vibration and may generate vibration or haptic effect. Although not shown in the drawings, the electronic device 201 may include a processing device (for example, a GPU) for mobile TV support. A processing device for mobile TV support may process media data according to standards such as digital multimedia broadcasting (DMB) or digital video broadcasting (DVB).

Each of the above-described components of the electronic device may be configured with at least one component and the name of a corresponding component may vary according to the kind of electronic device. According to embodiments of the present disclosure, an electronic device may include at least one of the above-described components, may not include some of the above-described components, or may include additional components. Additionally, some of components in an electronic device are configured as one entity, so that functions of corresponding components are performed identically.

Figure 3:
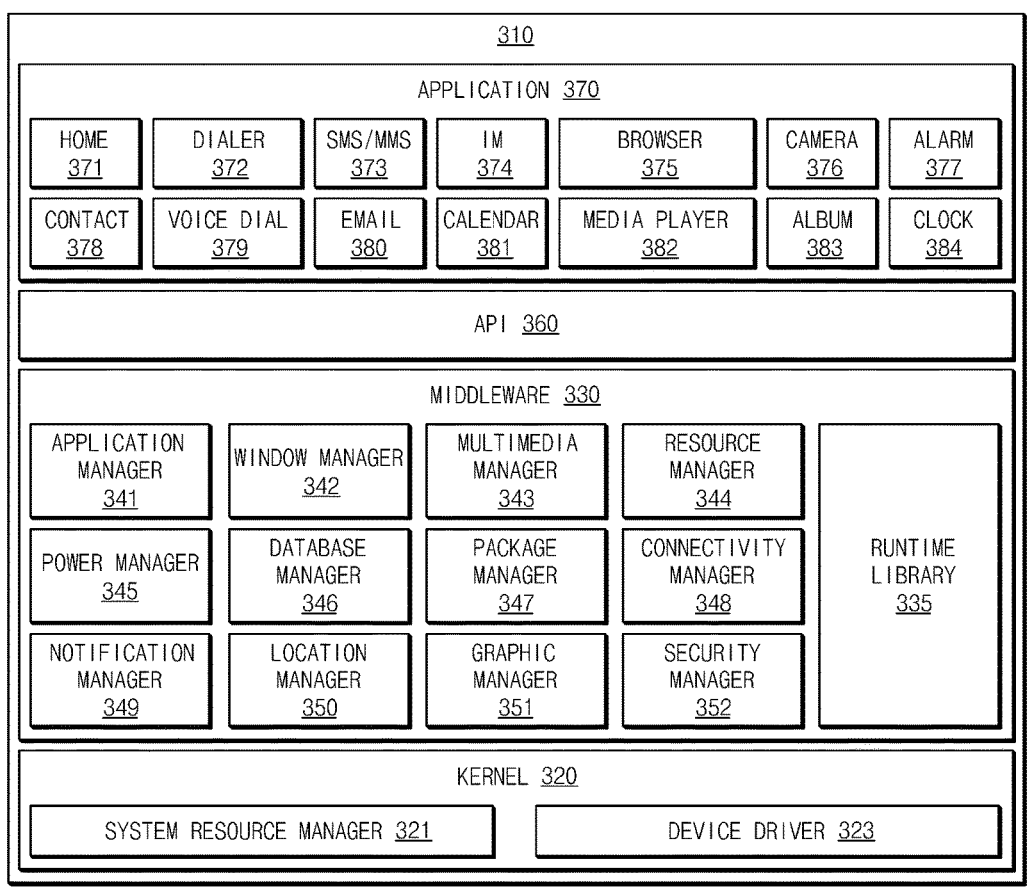
FIG. 3 is a block diagram illustrating a program module, according to an embodiment of the present disclosure.

FIG. 3 is a block diagram illustrating a program module, according to an embodiment of the present disclosure. A program module 310 (for example, the program 140 of FIG. 1) includes an OS for controlling a resource relating to an electronic device 101 and/or various applications (for example, the application program 147 of FIG. 1) running on the OS.

The program module 310 includes a kernel 320, a middleware 330, an API 360, and an application program (or an application) 370. At least part of the program module 310 may be preloaded on an electronic device or may be downloaded from another electronic device (for example, the first external electronic device 102, the second external electronic device 104, and the server 106).

The kernel 320 (for example, the kernel 141 of FIG. 1), for example, includes a system resource manager 321 and a device driver 323. The system resource manager 321 may perform the control, allocation, or retrieval of a system resource. According to an embodiment of the present disclosure, the system resource manager 321 may include a process management unit, a memory management unit, or a file system management unit. The device driver 323 may be embodied as, for example, a display driver, a camera driver, a Bluetooth driver, a sharing memory driver, a USB driver, a keypad driver, a WiFi driver, an audio driver, or an inter-process communication (IPC) driver.

The middleware 330, for example, may provide a function that the application 370 requires commonly, or may provide various functions to the application 370 through the API 360 in order to allow the application 370 to efficiently use a limited system resource inside the electronic device. According to an embodiment of the present disclosure, the middleware 330 (for example, the middleware 143 of FIG. 1) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335, for example, may include a library module that a complier uses to add a new function through a programming language while the application 370 is running. The runtime library 335 may perform a function on input/output management, memory management, or an arithmetic function.

The application manager 341, for example, may manage the life cycle of at least one application among the applications 370. The window manager 342 may manage a GUI resource used in a screen. The multimedia manager 343 may recognize a format for playing various media files and may encode or decode a media file by using the codec corresponding to a corresponding format. The resource manager 344 may manage a resource such as a source code, a memory, or a storage space of at least any one of the applications 370.

The power manager 345, for example, may operate together with a basic input/output system (BIOS) to manage the battery or power and may provide power information necessary for an operation of the electronic device. The database manager 346 may create, search, or modify a database used in at least one application among the applications 370. The package manager 347 may manage the installation or update of an application distributed in a package file format.

The connectivity manger 348 may manage a wireless connection such as WiFi or Bluetooth. The notification manager 349 may display or notify an event such as arrival messages, appointments, and proximity alerts to a user in a manner of not interrupting the user. The location manager 350 may manage location information on an electronic device. The graphic manager 351 may manage a graphic effect to be provided to a user or a user interface relating thereto. The security manager 352 may provide various security functions necessary for system security or user authentication. According to an embodiment, when an electronic device 101 includes a phone function, the middleware 330 may further include a telephony manager for managing a voice or video call function of the electronic device.

The middleware 330 may include a middleware module for forming a combination of various functions of the above-mentioned components. The middleware 330 may provide a module specialized for each type of OS to provide differentiated functions. Additionally, the middleware 330 may delete part of existing components or add new components dynamically.

The API 360 (for example, the API 145 of FIG. 1), for example, as a set of API programming functions, may be provided as another configuration according to the OS. For example, one API set may be provided for each platform, or at least two API sets may be provided for each platform.

The application 370 includes at least one application for providing functions, such as a home 371, a dialer 372, a short message service (SMS)/multimedia messaging service (MMS) 373, an instant message 374, a browser 375, a camera 376, an alarm 377, a contact 378, a voice dial 379, an e-mail 380, a calendar 381, a media player 382, an album 383, a clock 384, health care (for example, measure an exercise amount or blood sugar), or environmental information provision (for example, provide air pressure, humidity, or temperature information).

According to an embodiment of the present disclosure, the application 370 may include an information exchange application for supporting information exchange between the electronic device 101 and another electronic device 102 or 104 of FIG. 1). The information exchange application, for example, may include a notification relay application for relaying specific information to the external device, or a device management application for managing the external electronic device.

For example, the notification relay application may have a function for relaying to another electronic device notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of another electronic device communicating with the electronic device, an application operating in the external electronic device, or a service (for example, call service or message service) provided from the external electronic device.

According to an embodiment of the disclosure, the application 370 may include a specified application (for example, a health care application of a mobile medical device), according to the property of another electronic device. According to an embodiment of the present disclosure, the application 370 may include an application received from an external electronic device. According to an embodiment of the present disclosure, the application 370 may include a preloaded application or a third party application downloadable from a server. The names of components in the program module 310 may vary depending on the type of OS.

According to embodiments of the present disclosure, at least a part of the program module 310 may be implemented with software, firmware, hardware, or a combination thereof. At least a part of the program module 310, for example, may be implemented (for example, executed) by a processor (for example, the processor 210 of FIG. 2). At least part of the program module 310 may include a module, a program, a routine, sets of instructions, or a process to perform at least one function, for example.

Figure 4:
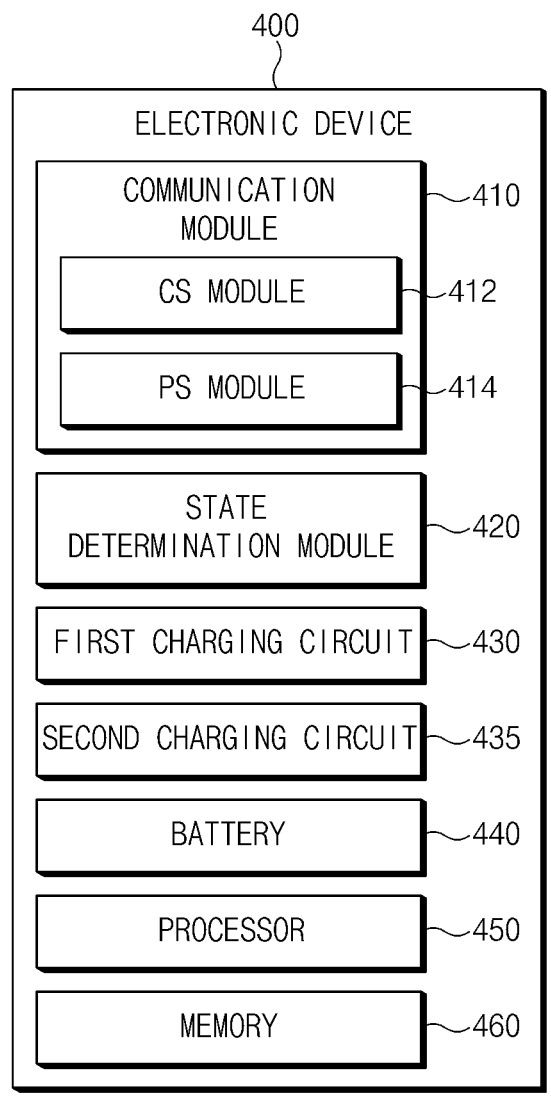
FIG. 4 is a block diagram illustrating an electronic device, according to an embodiment of the present disclosure.

FIG. 4 is a block diagram illustrating an electronic device, according to another embodiment of the present disclosure. Referring to FIG. 4, the electronic device 400 includes a communication module 41, a state determination module 420, a first charging circuit 430, a second charging circuit 435, a battery 440, a processor 450, and a memory 460.

The configuration of the electronic device 400 shown in FIG. 4 is merely one example of the present disclosure and various modifications are possible. For example, the electronic device 400 may further include a user interface for receiving a certain instruction or information from a user. In this case, the user interface may be an input device such as a keyboard, a mouse, etc., and may be a GUI displayed on the screen of the electronic device 400.

The communication module 410 may perform communication with devices outside of the electronic device 400. The communication module 410, for example, may perform circuit switching (CS) communication and packet switching (PS) communication. The CS communication may transmit/receive data through a dedicated line path existing between a transmission device and a reception device. The CS communication, for example, may be performed when a call is received or sent. The PS communication may be a method of dividing data and transmitting each divided data to the fastest node to a destination address and then, restoring them at the destination. The PS communication, for example, may be performed during web surfing through a web browser, downloading pictures, and playing videos on web. However, according to embodiments of the present disclosure, in the case of an LTE network, an operation of receiving or sending a call may be performed through the PS communication.

The state determination module 420 may detect that a charging device, for example, an adapter for charging, is connected to the electronic device 400. The charging device may operate according to a wireless charging method in addition to a wired charging method. Accordingly, a method that the charging device is connected to the electronic device 400 may include a wired method and a wireless method.

The state determination module 420 may detect that the charging device is connected to the electronic device 400 through various methods. For example, as a direct method, the state determination module 420 may determine whether the charging device is connected to the electronic device 400 through an input/output interface (for example, the input/output interface 150 of FIG. 1). Alternatively, as an indirect method, the state determination module 420 may determine whether the charging device is connected to the electronic device 400 by checking a change in the remaining amount of the battery 400 through a power management module (for example, the power management module 296 of FIG. 2).

The state determination module 420 may determine a state of the electronic device 400. For example, the state determination module 420 may determine whether the communication module 410 is in an operating state. That is, the state determination module 420 may determine whether the communication module 410 performs CS communication or PS communication.

The state determination module 420 may determine a state of charge (SOC) of the battery 440. Similar to that described above, the state determination module 420 may determine a SOC of the battery 440 by checking the remaining amount of the battery 400 through a power management module (for example, the power management module 296 of FIG. 2).

The state determination module 420 may determine a communication throughput of the electronic device 400, for example, by checking a data transfer rate or a data reception rate through the communication module 410.

The state determination module 420 may determine a heat generation level of the electronic device 400, for example, by checking the temperature of the battery 440 through the power management module. Additionally, the state determination module 420 may determine a heat generation level of the electronic device 400 by checking the temperature of the electronic device 400, the temperature of a circuit board (for example, a printed circuit board (PCB)), and the temperature of at least one electronic component mounted on the circuit board through a temperature/humidity sensor (for example, the temperature/humidity sensor 240J).

According to embodiments of the present disclosure, a state of the electronic device 400 may further include a state by a surrounding environmental factor of the electronic device 400 in addition to a state of the electronic device 400 itself. For example, a state of the electronic device 400 may further include an electric field state. The state determination module 420 may determine the electric field state by measuring a received signal strength indicator (RSSI) in the communication module 410.

Additionally, a state of the electronic device 400 may further include an electromagnetic interference (EMI) noise level. For example, the state determination module 420 may determine the EMI noise level. The EMI noise may affect the performance of the electronic device 400 and may occur inside or the outside of the electronic device 400.

Each of the first charging circuit 430 and the second charging circuit 435 may be a circuit for charging the battery 440 and may be a switching charger or a linear charger. Each of the switching charger and the linear charger may have advantages and disadvantages, as described in greater detail below. Accordingly, the processor 450 may select an appropriate charging circuit based on a state of the electronic device 400 determined by the state determination module 420.

The switching charger has a wide input/output voltage range and a high charging efficiency, uses one inductor, and has the advantage of low heat generation. However, the switching charger has disadvantages such as, for example, complex design, large size, high cost, and EMI noise occurrence.

The linear charger has advantages such as easy implementation, small size, and low cost. However, the linear charger has disadvantages such as, for example, low efficiency and great heat generation.

Based on the advantages and disadvantages of the switching charger and the linear charger, the switching charger is advantageous in terms of charging efficiency and heat generation. However, since the switching charger generates noise in a harmonic frequency band, it is inefficient to use the switching charger all the time. The noise reduces the reception sensitivity of a voice call and data packet service in a high frequency band and deteriorates communication throughput.

According to embodiments of the present disclosure, the first charging circuit 430 may be a switching charger and the second charging circuit 435 may be a linear charger. Alternatively, both the first charging circuit 430 and the second charging circuit 435 may be switching chargers. When both are switching chargers, the first charging circuit 430 and the second charging circuit 435 may operate in different frequencies, one of which may be a frequency band that generates EMI noise less.

The processor 450, for example, may implemented with a system on chip (SoC) and may include one or more of a CPU, a GPU, an image signal processor, an AP, or a CP. Additionally, the processor 450 may load instructions or data, which are received from at least one of other components (for example, the communication module 410, the state determination module 420, the first charging circuit 430, and the second charging circuit 435), from the memory 460, process the instructions or data, and store various data in the memory 460.

The processor 450 may adaptively select a charging circuit based on a state of the electronic device determined by the state determination module 420, and use the selected charging circuit.

According to embodiments of the present disclosure, while the communication module 410 performs communication, the processor 450 may select a linear charger. When the communication module 410 does not perform communication, the processor 450 may select a switching charger. Since the switching charger generates EMI noise, it may deteriorate communication performance while the communication module 410 performs communication.

When the electronic device 400 is in a strong electric field, the processor 450 may select a switching charger. When the electronic device 400 is disposed in a weak electric field, the processor 450 may select a linear charger. Since the switching charger generates EMI noise but has an excellent charging efficiency, if an electric field state is good, even though communication performance is somewhat deteriorated, it is efficient to increase a charging efficiency.

When the remaining amount of the battery 440 is less than a threshold value, the processor 450 may select a switching charger. When the remaining amount of the battery 440 is greater than a threshold value, the processor 450 may select a linear charger. Since the switching charger generates EMI noise but has an excellent charging efficiency, if the remaining amount of the battery 440 is less than a threshold value, it is possible to focus charging efficiency.

When the temperature of the electronic device 400 is greater than a threshold value, the processor 450 may select a switching charger. When the temperature of the electronic device 400 is less than a threshold value, the processor 450 may select a linear charger. Since the switching charger has a good charging efficiency and less heat generation, it is effective even though the temperature of the electronic device 400 is greater than a threshold value.

When a communication throughput of the communication module 410 is greater than a threshold value, the processor 450 may select a switching charger. When a communication throughput of the communication module 410 is less than a threshold value, the processor 450 may select a linear charger. Since the switching charger generates EMI noise but has an excellent charging efficiency, if a communication throughput is high, even though communication performance is somewhat deteriorated, it is efficient to increase a charging efficiency.

When EMI noise is less than a threshold value, the processor 450 may select a switching charger. When EMI noise is greater than a threshold value, the processor 450 may select a linear charger. Since the switching charger generates EMI noise but has an excellent charging efficiency, if EMI noise is less than a threshold value, even though communication performance is somewhat deteriorated, it is efficient to increase a charging efficiency.

According to the above-described embodiment, the processor 450 may select and use any one charging circuit according to whether the communication module 410 operates, an electric field state in which the electronic device 400 is disposed, the remaining amount of the battery 440, the temperature of the electronic device 400, a communication throughput of the communication module 410, and/or an EMI noise level.

While the communication module 410 operates, the processor 450 may use a linear charger. According to embodiments of the present disclosure, when the communication module 410 is in operation, the processor 450 may use the selected linear charger as it is or select and use a switching charger according to an electric field state in which the electronic device 400 is disposed, the remaining amount of the battery 440, the temperature of the electronic device 400, a communication throughput of the communication module 410, and/or an EMI noise level.

The linear charger that the processor 450 selects may be replaced with a switching charger (for example, a switching charger operating in a frequency band that generates EMI noise less), according to embodiments of the present disclosure.

The memory 460 (the memory 130 of FIG. 1 and the memory 230 of FIG. 2) may store data, for example, instructions for operations performed by the processor 450. In this case, data stored in the memory 460 includes data inputted and outputted between each of components in the electronic device 400 and data inputted and outputted between the electronic device 400 and components outside the electronic device 400. For example, the memory 460 may store information on a lock release solution set by a user. Additionally, the memory 460 may store data on a plurality of applications installed on the electronic device 400 and store an execution frequency for each of the plurality of applications.

It will be apparent to those skilled in the art that each of the communication module 410, the state determination module 420, the first charging circuit 430, the second charging circuit 435, the battery 440, the processor 450, and the memory 460 may be implemented separately from the electronic device 400 or at least one of them may be integrated and implemented.

Figure 5:
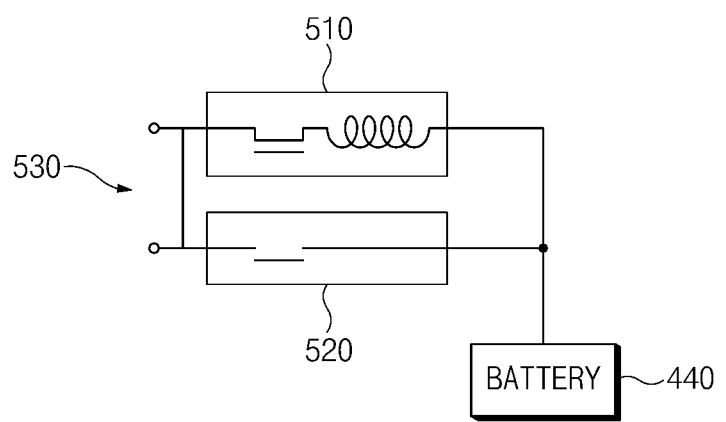
FIG. 5 is a diagram illustrating a battery and a plurality of charging circuits connected to the battery, according to an embodiment of the present disclosure.

FIG. 5 is a diagram illustrating a battery and a plurality of charging circuits connected to the battery, according to an embodiment of the present disclosure.

Each of a first charging circuit 510 and a second charging circuit 520 are connected to the battery 440. FIG. 5 illustrates that the first charging circuit 510 and the second charging circuit 520 are different types of charging circuits. The first charging circuit 510 is a switching charger including an inductor, and the second charging circuit 520 is a linear charger including a resistance without an inductor.

A charging device, for example, an adapter for charging, may be connected at reference numeral 530. The charging device may include one charging terminal and may be connected to a terminal extending from the first charging circuit 510 or a terminal extending from the second charging circuit 520. According to embodiments of the present disclosure, the charging device may include two charging terminals, and may be connected to a terminal extending from the first charging circuit 510 and a terminal extending from the second charging circuit 520.

Although the battery 440 is shown as a single battery, according to embodiments of the present disclosure, the battery 440 may include a plurality of battery packs. Each of the plurality of battery packs may be separately connected to the first charging circuit 510 and the second charging circuit 520.

Figure 6:
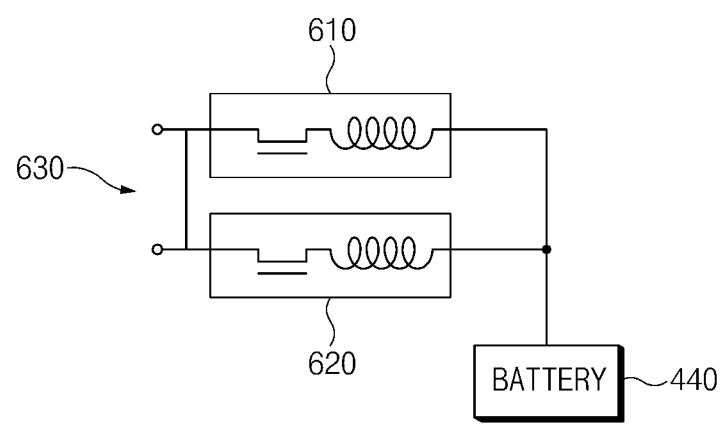
FIG. 6 is a diagram illustrating a battery and a plurality of charging circuits connected to the battery, according to another embodiment of the present disclosure.

FIG. 6 is a diagram illustrating a battery and a plurality of charging circuits connected to the battery, according to another embodiment of the present disclosure.

Each of a first charging circuit 610 and a second charging circuit 620 are connected to the battery 440. FIG. 6 illustrates that the first charging circuit 610 and the second charging circuit 620 are the same type charging circuit. The first charging circuit 610 and the second charging circuit 620 are switching chargers including an inductor. However, the first charging circuit 610 and the second charging circuit 620 may operate in different frequencies. The degree of occurring EMI noise may vary according to a frequency in which a charging circuit operates. According to embodiments of the present disclosure, one of the first charging circuit 610 and the second charging circuit 620 may operate in a frequency that generates relatively less EMI noise compared to the other charging circuit.

A charging device, for example, an adapter for charging, may be connected at reference numeral 630. The charging device may include one charging terminal to be connected to a terminal extending from the first charging circuit 610 or a terminal extending from the second charging circuit 620. According to embodiments of the present disclosure, the charging device may include two charging terminals to be connected to a terminal extending from the first charging circuit 610 and a terminal extending from the second charging circuit 620 together.

Although the battery 440 is shown as a single battery, according to embodiments of the present disclosure, the battery 440 may include a plurality of battery packs. Each of the plurality of battery packs may be separately connected to the first charging circuit 610 and the second charging circuit 620.

Figure 7:
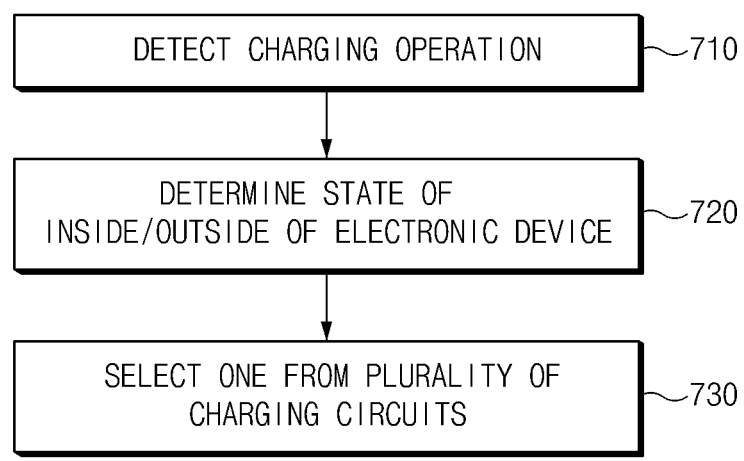
FIG. 7 is a flowchart illustrating a method of selecting one of a plurality of charging circuits by the electronic device, according to an embodiment of the present disclosure.

FIG. 7 is a flowchart illustrating a method of selecting one of a plurality of charging circuits by an electronic device, according to an embodiment of the present disclosure. The method of the electronic device 400 in FIG. 7, to select one of the plurality of charging circuits 430 and 435, may be performed by the electronic device 400 described with reference to FIGS. 1 to 6. Accordingly, contents about the method of the electronic device 400 described with reference to FIGS. 1 to 6 may be applied to FIG. 7.

In operation 710, the electronic device 400 detects a charging operation. The charging operation, for example, may be an operation in which a charging device is connected to the electronic device 400.

In operation 720, the electronic device 400 determines a state of the inside/outside of the electronic device 400. The state of the inside/outside of the electronic device 400 may include a state of the electronic device 400 itself and/or a state according to an environmental factor of the electronic device 400.

In operation 730, the electronic device 400 selects one of a plurality of charging circuits included in the electronic device 400. Furthermore, the electronic device 400 charges a battery of the electronic device 400 by using the selected charging circuit.

Figure 8:
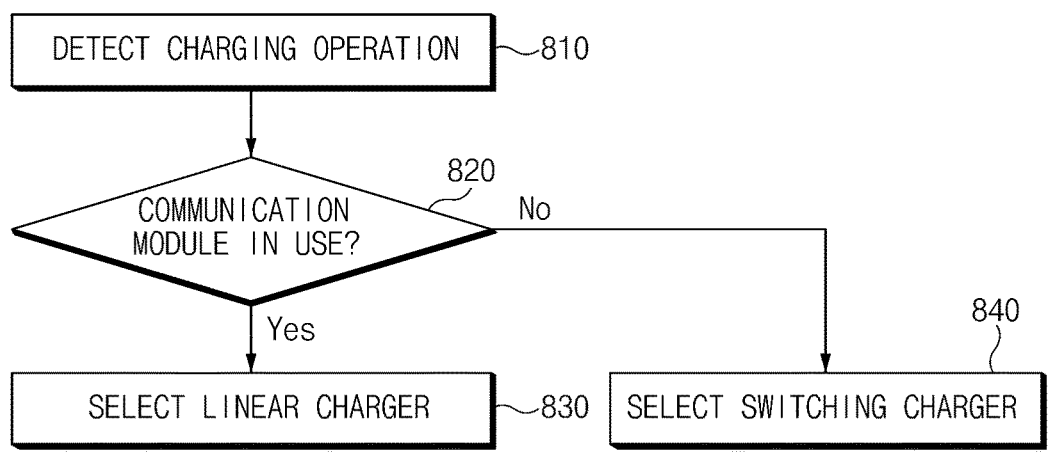
FIG. 8 is a flowchart illustrating a method of selecting one of a plurality of charging circuits by the electronic device, according to another embodiment of the present disclosure.

FIG. 8 is a flowchart illustrating a method of selecting one of the plurality of charging circuits by an electronic device, according to another embodiment of the present disclosure. The method of the electronic device 400 in FIG. 8, to select one of the plurality of charging circuits 430 and 435, may be performed by the electronic device 400 described with reference to FIGS. 1 to 6. Accordingly, contents about the method of the electronic device 400 described with reference to FIGS. 1 to 6 to select one of the plurality of charging circuits 430 and 435 may be applied to FIG. 8.

In operation 810, the electronic device 400 detects a charging operation. The charging operation, for example, may be an operation in which a charging device is connected to the electronic device 400.

In operation 820, the electronic device 400 determines whether the communication module 410 is in operation. When the communication module 410 performs PS communication or CS communication, the communication module 410 is in use. When the communication module 410 is in use, the electronic device selects a linear charger in operation 830. When the communication module 410 is not in use, the electronic device selects a switching charger in operation 840.

Figure 9:
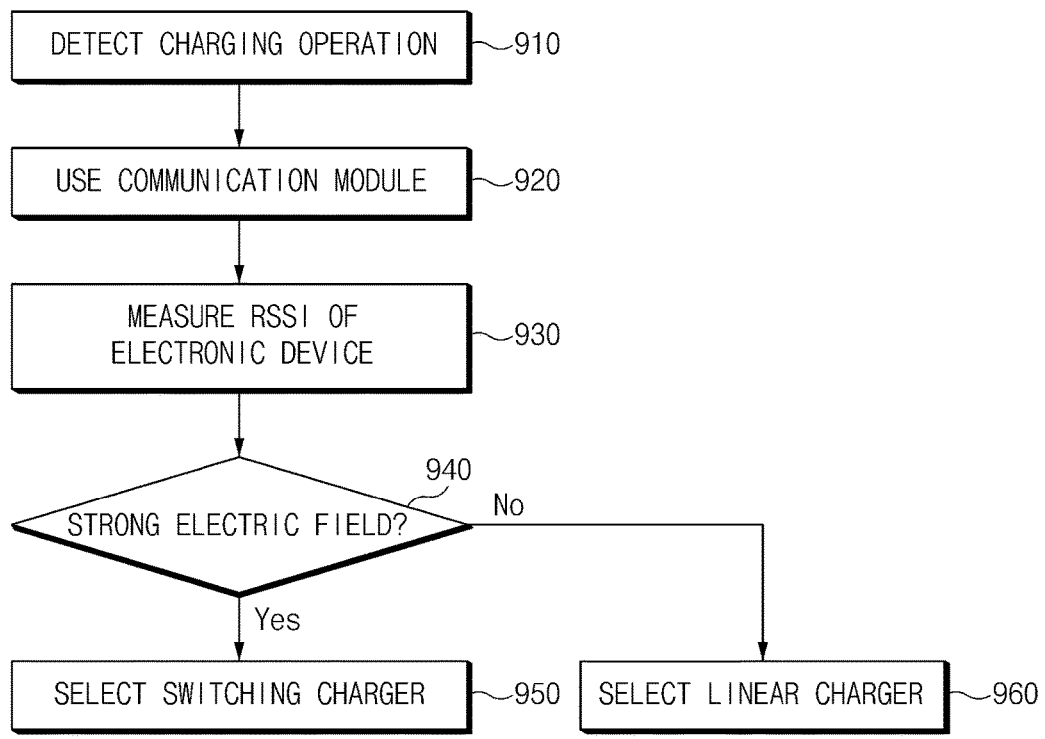
FIG. 9 is a flowchart illustrating a method of selecting one of a plurality of charging circuits by the electronic device, according to another embodiment of the present disclosure.

FIG. 9 is a flowchart illustrating a method of selecting one of a plurality of charging circuits by an electronic device, according to another embodiment of the present disclosure. The method of the electronic device 400 in FIG. 9, to select one of the plurality of charging circuits 430 and 435, may be performed by the electronic device 400 described with reference to FIGS. 1 to 6. Accordingly, contents about the method of the electronic device 400 described with reference to FIGS. 1 to 6 to select one of the plurality of charging circuits 430 and 435 may be applied to FIG. 9.

In operation 910, the electronic device 400 detects a charging operation. The charging operation, for example, may be an operation in which a charging device is connected to the electronic device 400.

In operation 920, the electronic device 400 performs communication by using the communication module 410. The performed communication may include at least one of PS communication and CS communication.

In operation 930, the electronic device 400 measures the RSSI thereof.

In operation 940, the electronic device 400 determines whether the electronic device 400 is disposed in a strong electric field or a weak electric field based on the measured RSSI value. When the electronic device 400 is disposed in a strong electric field, the electronic device selects a switching charger, in operation 950. When the electronic device 400 is disposed in a weak electric field, the electronic device selects a linear charger, in operation 960.

Figure 10:
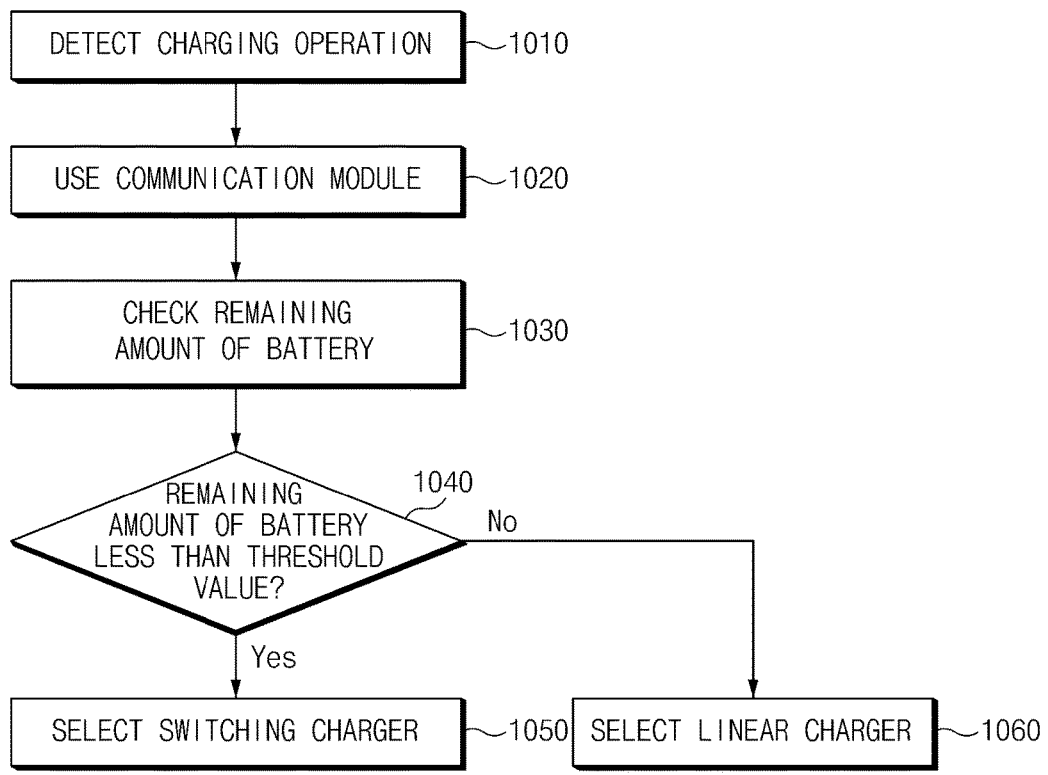
FIG. 10 is a flowchart illustrating a method of selecting one of a plurality of charging circuits by the electronic device, according to another embodiment of the present disclosure.

FIG. 10 is a flowchart illustrating a method of selecting one of a plurality of charging circuits by an electronic device, according to another embodiment of the present disclosure. The method of the electronic device 400 in FIG. 10, to select one of the plurality of charging circuits 430 and 435, may be performed by the electronic device 400 described with reference to FIGS. 1 to 6. Accordingly, contents about the method of the electronic device 400 described with reference to FIGS. 1 to 6 to select one of the plurality of charging circuits 430 and 435 may be applied to FIG. 10.

In operation 1010, the electronic device 400 detects a charging operation. The charging operation, for example, may be an operation in which a charging device is connected to the electronic device 400.

In operation 1020, the electronic device 400 performs communication by using the communication module 410. The performed communication may include at least one of PS communication and CS communication.

In operation 1030, the electronic device 400 measures the remaining amount of the battery 440 in the electronic device 400.

In operation 1040, the electronic device 400 determines whether the measured remaining amount of the battery 440 is greater than or equal to a threshold value. If the measured remaining amount of the battery 440 is less than the threshold value, the electronic device selects the switching charger, in operation 1050. If the remaining amount of the battery 440 is greater than or equal to the threshold value, the electronic device selects the linear charger, in operation 1060.

Figure 11:
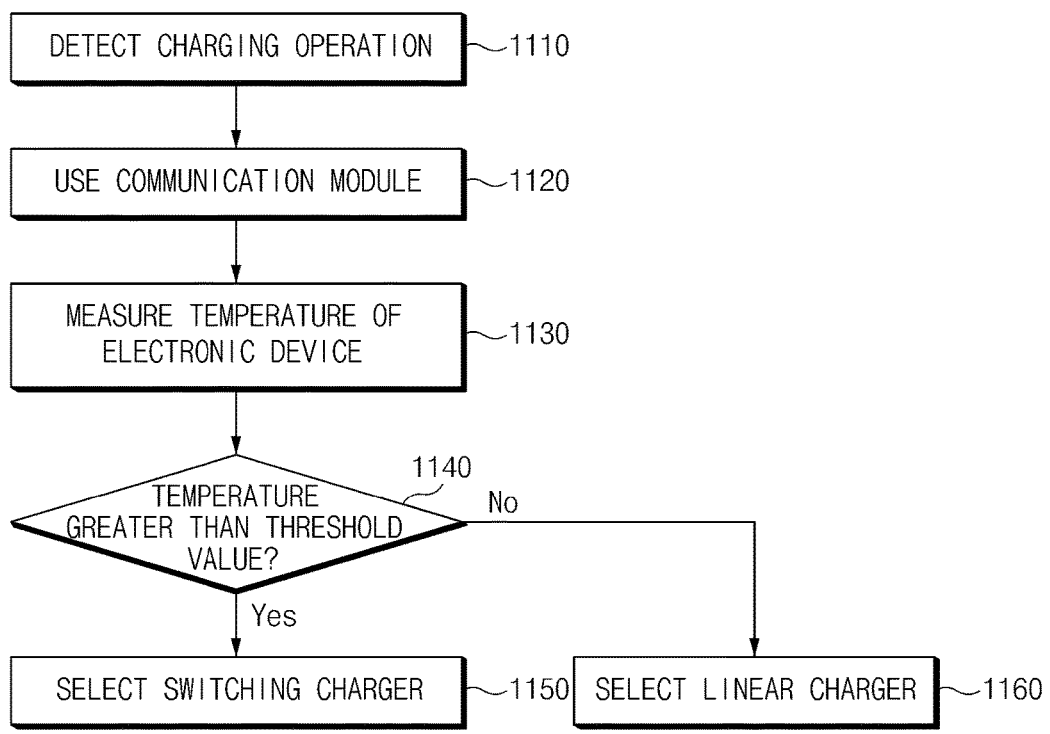
FIG. 11 is a flowchart illustrating a method of selecting one of a plurality of charging circuits by an electronic device, according to another embodiment of the present disclosure.

FIG. 11 is a flowchart illustrating a method of selecting one of a plurality of charging circuits by an electronic device, according to another embodiment of the present disclosure. The method of the electronic device 400 in FIG. 11, to select one of the plurality of charging circuits 430 and 435, may be performed by the electronic device 400 described with reference to FIGS. 1 to 6. Accordingly, contents about the method of the electronic device 400, described with reference to FIGS. 1 to 6, to select one of the plurality of charging circuits 430 and 435 may be applied to FIG. 11.

In operation 1110, the electronic device 400 detects a charging operation. The charging operation, for example, may be an operation in which a charging device is connected to the electronic device 400.

In operation 1120, the electronic device 400 performs communication by using the communication module 410. The performed communication may include at least one of PS communication and CS communication.

In operation 1130, the electronic device 400 measures the temperature of the electronic device 400.

In operation 1140, the electronic device 400 determines whether the measured temperature of the electronic device 400 is greater than a threshold value. When the temperature of the electronic device 400 is greater than the threshold value, the electronic device 400 selects the switching charger, in operation 1150. When the temperature of the electronic device 400 is less than or equal to the threshold value, the electronic device 400 selects the linear charger, in operation 1160.

Figure 12:
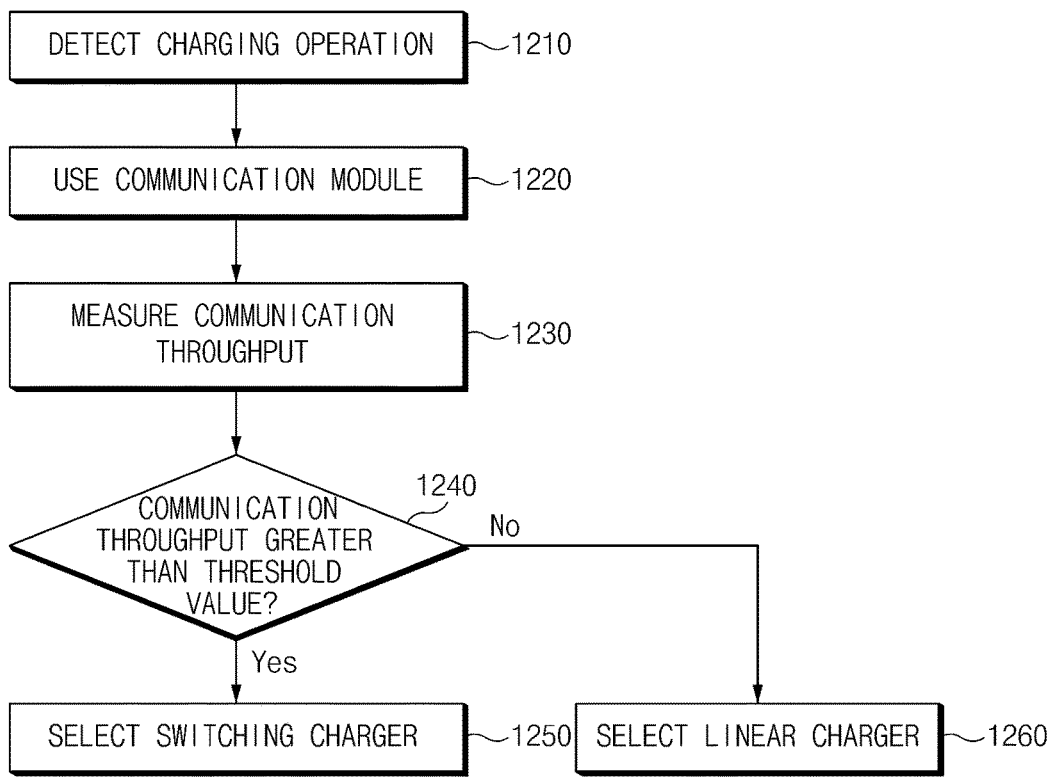
FIG. 12 is a flowchart illustrating a method of selecting one of a plurality of charging circuits by an electronic device, according to another embodiment of the present disclosure.

FIG. 12 is a flowchart illustrating a method of selecting one of a plurality of charging circuits by an electronic device, according to another embodiment the present disclosure. The method of the electronic device 400 in FIG. 12, to select one of the plurality of charging circuits 430 and 435, may be performed by the electronic device 400 described with reference to FIGS. 1 to 6. Accordingly, contents about the method of the electronic device 400, described with reference to FIGS. 1 to 6, to select one of the plurality of charging circuits 430 and 435 may be applied to FIG. 12.

In operation 1210, the electronic device 400 detects a charging operation. The charging operation, for example, may be an operation in which a charging device is connected to the electronic device 400.

In operation 1220, the electronic device 400 performs communication by using the communication module 410. The performed communication may include at least one of PS communication and CS communication.

In operation 1230, the electronic device 400 measures a communication throughput of the electronic device 400.

In operation 1240, the electronic device 400 determines whether the measured communication throughput of the electronic device 400 is greater than a threshold value. When the communication throughput of the electronic device 400 is greater than the threshold value, the electronic device 400 selects the switching charger, in operation 1250. When the communication throughput of the electronic device 400 is less than or equal to the threshold value, the electronic device selects the linear charger, in operation 1260.

Figure 13:
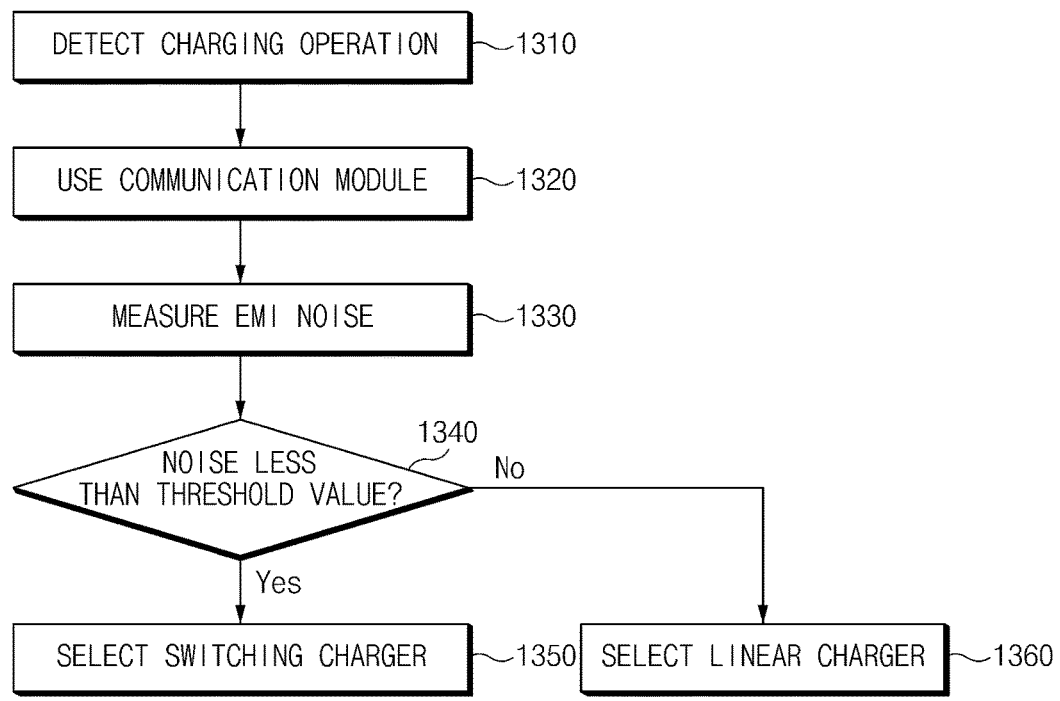
FIG. 13 is a flowchart illustrating a method of selecting one of a plurality of charging circuits by an electronic device, according to another embodiment of the present disclosure.

FIG. 13 is a flowchart illustrating a method of selecting one of a plurality of charging circuits by an electronic device, according to another embodiment of the present disclosure. The method of the electronic device 400 in FIG. 13, to select one of the plurality of charging circuits 430 and 435, may be performed by the electronic device 400 described with reference to FIGS. 1 to 6. Accordingly, contents about the method of the electronic device 400, described with reference to FIGS. 1 to 6, to select one of the plurality of charging circuits 430 and 435 may be applied to FIG. 13.

In operation 1310, the electronic device 400 detects a charging operation. The charging operation, for example, may be an operation in which a charging device is connected to the electronic device 400.

In operation 1320, the electronic device 400 performs communication by using the communication module 410. The performed communication may include at least one of PS communication and CS communication.

In operation 1330, the electronic device 400 measures an EMI noise level thereof.

In operation 1340, the electronic device 400 determines whether the measured EMI noise level of the electronic device 400 is less than a threshold value. When the measured EMI noise level of the electronic device 400 is less than the threshold value, the electronic device 400 selects the switching charger, in operation 1350. When the measured EMI noise level of the electronic device 400 is greater than or equal to the threshold value, the electronic device 400 selects the linear charger, in operation 1360.

An electronic device according to various embodiments of the present disclosure may include: a first charging circuit and a second charging circuit configured to charge a battery of the electronic device; a state determination module configured to detect a connection of the electronic device to a charging device, and determine a state of the electronic device; and a processor configured to select one of the first charging circuit and the second charging circuit based on the state of the electronic device.

According to various embodiments of the present disclosure, the electronic device may further include a communication module configured to perform communication. The state of the electronic device may include at least one of performing CS communication and performing PS communication.

According to various embodiments of the present disclosure, when the communication module performs the CS communication or the PS communication, the processor may be further configured to select the one of the first charging circuit and the second charging circuit that generates less electromagnetic interference (EMI) noise.

According to various embodiments of the present disclosure, the state of the electronic device further includes a state of charge of the battery of the electronic device.

According to various embodiments of the present disclosure, when the communication module performs CS communication or PS communication and the state of charge is less than a predetermined value, the processor may be further configured to select the one of the first charging circuit and the second charging circuit having a better charging efficiency.

According to various embodiments of the present disclosure, the state of the electronic device may further include an electric field state and the state determination module may be further configured to determine the electric field state by measuring a received signal strength indicator (RSSI).

According to various embodiments of the present disclosure, when the communication module performs CS communication or PS communication and the electric field state is determined as a strong electric field, the processor may be further configured to select the one of the first charging circuit and the second charging circuit having a better charging efficiency.

According to various embodiments of the present disclosure, the state of the electronic device may further include a communication throughput of the electronic device.

According to various embodiments of the present disclosure, when the communication module performs CS communication or PS communication and the communication throughput of the electric device is greater than a predetermined value, the processor may be further configured to select one of the first charging circuit and the second charging circuit having a better charging efficiency.

According to various embodiments of the present disclosure, the state of the electronic device may further include an electro magnetic interference (EMI) noise level.

According to various embodiments of the present disclosure, when the communication module performs CS communication or PS communication and the EMI noise level is less than a predetermined value, the processor may be further configured to select having a better charging efficiency.

According to various embodiments of the present disclosure, the state of the electronic device may further include a heat generation level.

According to various embodiments of the present disclosure, when the communication module performs CS communication or PS communication and the heat generation level is greater than a predetermined value, the processor may be further configured to select the one of the first charging circuit and the second charging circuit having a relatively better charging efficiency from the first charging circuit and the second charging circuit.

According to various embodiments of the present disclosure, the first charging circuit may be a switching changer and the second charging circuit may be a linear charger.

According to various embodiments of the present disclosure, the first charging circuit may be a switching changer and the second charging circuit may be a switching charger operating in a frequency that is different from that of the first charging circuit.

A method performed in an electronic device according to various embodiments of the present disclosure includes: detecting a connection of the electronic device with a charging device; determining a state of the electronic device; and selecting one of a first charging circuit and a second charging circuit based on the state of the electronic device.

According to various embodiments of the present disclosure, the state of the electronic device may include at least one of performing CS communication and performing PS communication.

According to various embodiments of the present disclosure, selecting one of the first charging circuit and the second charging circuit may include generating less electromagnetic interference (EMI) noise when the electronic device performs the CS communication or the PS communication.

According to various embodiments of the present disclosure, the first charging circuit may be a switching charger and the second charging circuit may be a linear charger.

According to various embodiments of the present disclosure, the first charging circuit may be a switching charger and the second charging circuit may be a switching charger operating in a frequency that is different from that of the first charging circuit.

By at least one of embodiments of the present disclosure, the electronic device and method e may include a plurality of charging circuits and may select one charging circuit to be used from the plurality of charging circuits based on a state of the electronic device. Accordingly, the electronic device and method, according to embodiments of the present disclosure, may efficiently charge a battery of the electronic device by using an appropriate charging circuit based on a state of the electronic device.

The term "module", as used herein, may mean a unit including a combination of at least one of hardware, software, and firmware. The term "module" and the terms "unit", "logic", "logical block", "component", and "circuit" may be interchangeably used. A module may be a minimum unit or part of an integrally configured component. A module may be a minimum unit performing at least one function or part thereof. A module may be implemented mechanically or electronically. For example, a module, according to embodiments of the present disclosure, may include at least one of an application-specific integrated circuit (ASIC) chip performing certain operations, field-programmable gate arrays (FPGAs), or a programmable-logic device, all of which are known or are to be developed.

According to embodiments of the present disclosure, at least part of a device (for example, modules or functions thereof) or a method (for example, operations or steps), for example, as in a form of a programming module, may be implemented using an instruction stored in computer-readable storage media. When at least one processor (for example, the processor 120 of FIG. 1) executes an instruction, it may perform a function corresponding to the instruction. The non-transitory computer-readable storage media may include the memory 130 of FIG. 1, for example.

The non-transitory computer-readable storage media may include hard disks, floppy disks, magnetic media (for example, magnetic tape), optical media (for example, compact disc-ROM (CD-ROM), and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module, according to embodiments of the present disclosure, may include at least one of the above-described components, may not include some of the above-described components, or may further include another component. Operations performed by a module, a programming module, or other components, according to embodiments of the present disclosure may be executed through a sequential, parallel, repetitive, or heuristic method. Additionally, some operations may be executed in a different order or may be omitted, or other operations may be added. Moreover, embodiments disclosed herein are suggested for the description and understanding of technical content but do not limit the range of the present disclosure. Accordingly, the range of the present disclosure should be interpreted as including all modifications or various other embodiments based on the technical idea of the present disclosure.

While the present disclosure has been shown and described with reference to certain embodiments thereof, it will be understood by those skilled in the art that various changes in form and detail may be made therein without departing from the spirit and scope of the disclosure as defined by the appended claims.

What is claimed is:

1. An electronic device comprising:
   a first charging circuit and a second charging circuit configured to charge a battery of the electronic device;
   a state determination module configured to detect a connection of the electronic device to a charging device, and determine a state of the electronic device; and
   a processor configured to select one of the first charging circuit and the second charging circuit based on the state of the electronic device,
   wherein the first charging circuit comprises a switching charger and the second charging circuit comprises a linear charger,
   wherein the state determination module is configured to detect at least one state from a group comprising surrounding electric field strength, remaining battery amount, battery temperature, communication throughput, and EMI noise, and
   wherein the processor is configured to select the switching charger, when the detected state is included in a first range, and to select the linear charger, when the detected state is included in a second range.

2. The electronic device of claim 1, further comprising a communication module configured to perform communication,
   wherein the detected at least one state associated with the communication via the communication module comprises at least one of performing circuit switching (CS) communication and performing packet switching (PS) communication.

3. The electronic device of claim 2, wherein, when the communication module performs the CS communication or the PS communication, the processor is further configured to select the one of the first charging circuit and the second charging circuit that generates less electromagnetic interference (EMI) noise.

4. The electronic device of claim 3, wherein the detected at least one state associated with the communication via the communication module further comprises an electric field state, and the state determination module is further configured to determine the electric field state by measuring a received signal strength indicator (RSSI).

5. The electronic device of claim 4, wherein, when the communication module performs CS communication or PS communication and the electric field state is determined as a strong electric field, the processor is further configured to select the one of the first charging circuit and the second charging circuit having a better charging efficiency.

6. The electronic device of claim 3, wherein the detected at least one state associated with the communication via the communication module further comprises communication throughput of the electronic device.

7. The electronic device of claim 6, wherein, when the communication module performs CS communication or PS communication and the communication throughput of the electric device is greater than a predetermined value, the processor is further configured to select the one of the first charging circuit and the second charging circuit having a better charging efficiency.

8. The electronic device of claim 3, wherein the at least one state associated with the communication via the communication module further comprises an electromagnetic interference (EMI) noise level.

9. The electronic device of claim 8, wherein, when the communication module performs CS communication or PS communication and the EMI noise level is less than a predetermined value, the processor is further configured to select the one of the first charging circuit and the second charging circuit having a better charging efficiency.

10. A method performed in an electronic device, the method comprising:
    detecting a connection of the electronic device with a charging device;
    determining a state of the electronic device; and
    selecting one of a first charging circuit and a second charging circuit based on the state of the electronic device,
    wherein the first charging circuit comprises a switching charger and the second charging circuit comprises a linear charger;
    wherein the determining the state of the electronic device includes detecting at least one state from a group comprising surrounding electric field strength, remaining battery amount, battery temperature, communication throughput and EMI noise, and
    wherein the selecting one of the first charging circuit and the second charging circuit includes selecting the switching charger, when the detected state is included in a first range, and selecting the linear charger, when the detected state is included in a second range.

11. The method of claim 10, wherein the detected at least one state comprises at least one of performing circuit switching (CS) communication and performing packet switching (PS) communication.

12. The method of claim 11, wherein selecting one of the first charging circuit and the second charging circuit comprises generating less electromagnetic interference (EMI) noise when the electronic device performs CS communication or PS communication.

\* \* \* \* \*